P. MUELLER.
SEAL FOR SERVICE COCKS.
APPLICATION FILED MAR. 15, 1912.
1,048,198.
Patented Dec. 24, 1912.
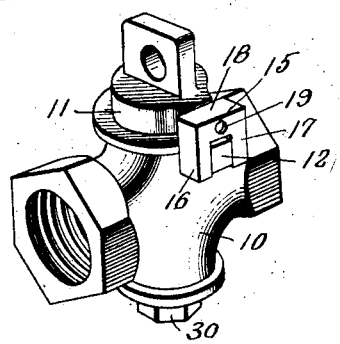
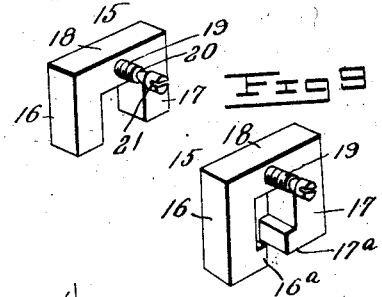
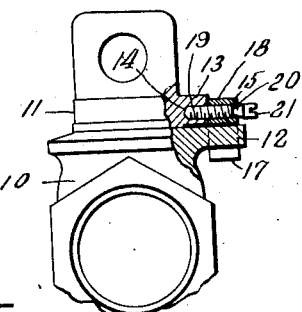
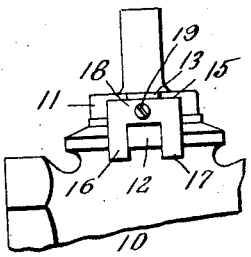
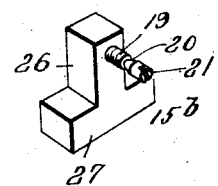
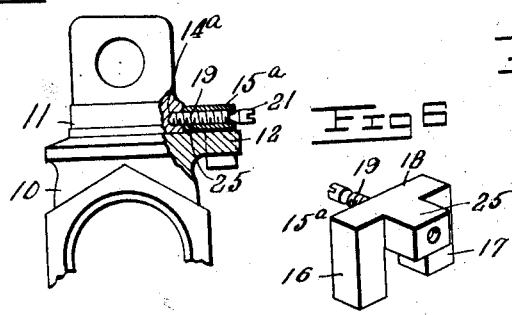
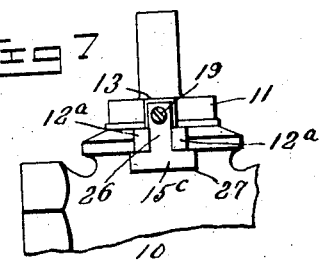
Inventor
Philip Mueller
Witnesses
By Meyers, Cushman & Rea
Attorney

UNITED STATES PATENT OFFICE.

PHILIP MUELLER, OF DECATUR, ILLINOIS, ASSIGNOR TO H. MUELLER MFG. CO., OF DECATUR, ILLINOIS, A CORPORATION OF ILLINOIS.

SEAL FOR SERVICE-COCKS.

1,048,198. Specification of Letters Patent. Patented Dec. 24, 1912.

Application filed March 15, 1912. Serial No. 684,056.

*To all whom it may concern:*

Be it known that I, PHILIP MUELLER, a citizen of the United States, residing at Decatur, in the county of Macon and State of Illinois, have invented new and useful Improvements in Seals for Service-Cocks, of which the following is a specification.

This invention relates to an improvement in seals or locking means for use on cocks in connection with gas and water service, and is shown and described herein as being applied to what is known to the trade as locking-wing gas cocks, in which a wing is cast on the cock body and a similar wing on the key for the same. Heretofore these wings have been so made that when the cock is in closed position, holes, which are bored in the wings, register with each other and thus make it possible to attach a padlock to such a cock by passing the bow of the lock through said holes and thus lock the cock in a closed position, making it impossible to tamper with the same, unless the padlock is maliciously opened, broken or stolen. This method of locking the gas cocks is expensive, not only because the cost of a good pad lock is nearly equal to that of the cock itself, but such locks are liable to be opened by persons criminally inclined, and the cock turned on and the gas used without authority or knowledge of the company that furnished the gas or water. This difficulty, however, is overcome by the present invention as besides locking the cock in closed position, it forms a cheap, substantial and practical sealing means for the cock key, which as soon as the cock is tampered with, or an attempt made to turn the key even slightly the lock and seal is broken and cannot be replaced by the one who broke it, as this special form of lock and seal can be obtained only from those who have authority to operate the cocks. After the cock has once been locked and sealed the key cannot be turned without breaking said member, as it is made of a frangible material and so fastened to the cock that it cannot be removed even by those in authority without breaking it.

This invention, although designed primarily for use on gas cocks and will be so described in connection therewith throughout this specification, may with equal advantage be applied to other kinds of cocks, such as are used for regulating the flow of water and oil, and also to other articles and in other situations than that to which the specific embodiment herein described is adapted. It is well known that there are gas lock wing cock seals of various kinds in use at the present time and serving the same purpose as a padlock, but these are objectionable for several reasons. Most of them are quite expensive and difficult to make, and when frequent renewals are required, owing to the number of times which the cocks must be opened and closed on some occasions, the expense involved in renewing these seals alone amounts to a considerable item. Furthermore, most of these seals require special tools to affix them to the cock, or special rivets are necessary, and the expense of providing these articles must be taken into consideration, besides the inconvenience of carrying them all the time when needed but a part of the time. In other forms of seals, rivets or keys are used, and when these are broken it has been found that they can be easily duplicated by parties desiring to break the seals without authority, and who provide themselves with suitable sealing pliers or tools so that they can imitate the exact seal and thus it is known that the seal is sometimes broken and made again with such skill that the cocks have been tampered with a number of times and much gas or other fluid stolen before the theft has been detected.

Another important object of the invention is to do away with the large wings cast on the cock and the key, and also to eliminate the necessity of boring holes in said wings to receive the padlock or seal, as by the present invention small lugs are used instead of the large wings and a considerable saving in material is effected as well as a saving in the cost of boring the holes in the wings, and a further saving in the cost of padlocks which are unnecessary.

In carrying out the invention, instead of casting relatively large wings on the cock and the key, small projecting lugs are substituted therefor, as noted above, and when these lugs are alined on closing the cock, a locking and sealing member, made of frangible material, is secured to the lugs by a suitable irremovable means, thereby rendering it impossible to disconnect the member and the cock can only be opened by breaking said member.

The object of the invention, therefore, is to provide a frangible combined lock and seal member for its intended purposes which shall be cheap and efficient and which may be easily and quickly applied by the use of a simple tool in a few minutes, and which, when applied, securely locks and seals the parts against movement without breaking said member, which will be difficult and troublesome to duplicate.

This invention will be more readily understood by referring to the following detail description in connection with the accompanying drawings, in which—

Figure 1 is a perspective view of a gas cock with the locking and sealing member applied thereto. Fig. 2 is a perspective view of the locking and sealing member disconnected from the cock. Fig. 3 is an end view of a cock, the locking and sealing member and a portion of the cock being shown in section. Fig. 4 is a side view of the upper portion of a cock with the locking and sealing member in position thereon. Fig. 5 is a view of a cock showing a modified form of locking and sealing member applied thereto. Fig. 6 is a perspective view of the modified type of locking seal used with the cock represented in Fig. 5. Fig. 7 is a view showing a further modified form of the locking seal as applied. Fig. 8 is a perspective view of the locking seal for the cock illustrated in Fig. 7. Fig. 9 is a perspective view of another type of locking seal.

Referring to Figs. 1 to 4 of the drawings, the numeral 10 designates the gas cock body, of well known type, and 11 the turning key therefor. Projecting laterally from the side of the gas cock and flush with the opening into which the key 11 enters is a lug or projection 12 cast on the cock body. A similar but shorter projection 13 of the same width as the lug or projection 12 extends laterally from the key 11 in such position as to aline with the latter lug when the cock is turned to full cut-off position. One of said projections, preferably the one numbered 13, has a threaded hole 14 formed in its outer face for a purpose to be hereinafter described.

The projections 12 and 13, when placed in parallelism are secured together, so that neither key nor cock body can be turned relatively to each other, by means of a locking and sealing member 15 which, in the present instance, is formed with two parallel legs 16 and 17, spaced apart and connected at the top by a transverse bar 18. This member is preferably made of cast iron or some other frangible material in a single piece which may be easily broken by a hammer when it is desired to turn the key 11 of the cock. Even an attempt to turn the key with the locking and sealing member in place will break the latter. Owing to the shortness of the lug 13 the legs 16 and 17 of the member 15 will, when applied, straddle the lug 12 only, the transverse bar 18 abutting against the end of the lug 13 as shown. The locking member 15 is secured to and sealed on the cock by means of a screw 19 having a weakened portion 20 just below its head or slotted end 21 and threaded into the transverse bar 18 in position to enter the threaded hole 14 in the lug 13. When screwed home the head 21 is broken off below the outer face of the member 15, thus preventing the removal of the screw and sealing the member. When it is desired to cut off gas or other fluid passing through the cock, the key is turned until the projection 13 on the key is parallel with the projection 12 on the cock. The locking and sealing member 15 is then placed over the projection 12 with the inner side of the transverse bar 18 abutting against the lug 13, as clearly shown in the drawing, and the screw 19 turned until its weakened portion 20 is within the outer face of said member. The head of the screw may then be struck with a hammer which will cause it to break off just within the face or side of the locking and sealing member, or a continual turning of the screw driver after the inner end of the screw bottoms in the hole 14, will cause the screw head to break off as the weakened portion of said screw is not sufficiently strong to stand the extra strain which may be placed upon it after it has reached its limit of movement. The locking member, therefore, not only serves as a means for preventing the key being turned but also as a seal, it being practically impossible to remove the member after the head of the screw has been broken off within the screw hole without breaking said member. If desired the legs 16 and 17 of the member 15 may be lengthened and inturned feet formed on the ends thereof as in Fig. 9. These feet extend under the lug 12 and prevent the key 11 from being lifted out of the cock 10 by unscrewing the nut 30 on the bottom of the key. Should an unauthorized person desire to open the cock for the purpose of surreptitiously using the fluid passing therethrough it will be necessary for such person to break the locking member, and as such members are difficult to procure, they being in possession only of persons authorized to use them, the action of said person would be discovered. As a further protection the locking member may be provided with the monogram, initial or other insignia of the company owning the cock, so that should a new locking member be made and applied the difference between said locking member and that of the one originally placed on the cock will be easily detected. After locking and sealing the cock, if the latter is to be turned on any authorized person may break the locking and sealing member with a blow of a hammer mer or other instrument, or by turning the key 11, and remove the fragments, thus releasing the key and permitting it to be turned to open the cock.

One modification of the locking and sealing member just described is illustrated in Figs. 5 and 6 of the drawing. As there shown, the projection 13 on the key 11 is omitted, the corresponding side of the key being flattened and provided with a threaded hole 14ª for the screw 19. The locking and sealing member 15ª, which is of the same general shape as that previously described, has a lug 25 projecting from its rear side or face, the under surface of which is continuous with the under surface of the transverse bar 18. When the member is applied to a cock, the lug 25 rests on the lug 12 with its end against the flattened portion of the key. The screw 19 extends through the lug 25 and into the threaded hole 14ª in the plug when the member is secured on the cock.

A further modification of the invention is shown in Figs. 7 and 8. In this instance, instead of a single lug or projection 12 on the cock, spaced parallel lugs 12ª are substituted between which the stem 26 of a frangible T shaped locking and sealing member 15ᵇ is inserted, the upper end of which stem bears against the outer face of the lug 13 and is fastened thereto by a screw 19 similar to the screw hereinabove described, threaded into the hole 14 in the lug 13. The head 27 of the member 15ᵇ extends laterally beneath the lugs 12ª and prevents removal of the key from its seat in the cock by taking off the nut 30 on the bottom of the key. The head 27 may be omitted if desired and the member 15ᵇ will still serve as a lock and seal against turning the key.

This device is easy to manufacture and is very cheap, as the members are produced in large quantities from the same pattern and the screw hole formed therein made on well known drilling and threading machines. Furthermore the device is easily applied and as easily removed, the only tools being necessary are those always carried by a plumber or other person, namely a hammer and a screw driver.

It is to be understood that the form of the locking member herein shown is designed particularly for use on cocks, but other forms may be given to said member without departing from the spirit of the invention, and furthermore, it may be used to seal together two or more parts other than a cock.

Having fully described my invention what I claim as new is:—

1. In combination with a cock body having a projecting lug, and a cock key having a similar but shorter lug adapted to be brought into parallelism with the lug on the cock body, of a frangible locking member adapted to interengage with the lug on said cock body and bear against the shorter lug on the key, and a screw for fastening said frangible locking member to the key, said screw having a weakened portion intermediate its ends whereby its head end may be broken off below the face of the locking member.

2. In combination with a cock body, having a projecting lug, a cock key having a similar but shorter lug adapted to be brought into parallelism with the lug on the cock body, of a frangible locking member interengaging the long lug and bearing against the outer face of the short lug, and a screw threaded into a part of said locking member and into the short lug, said screw having a weakened portion intermediate its ends whereby its head end may be broken off below the face or side of said locking member.

3. In combination with a cock body having a projecting lug, and a cock key having a similar but shorter lug adapted to be brought into parallelism with the lug on the cock body, of a frangible U-shaped locking member adapted to straddle the long lug and bear against the outer face of the short lug, and a screw threaded into said locking member and into the short lug to hold said cock parts against relative movement, said screw having a weakened portion immediately below its head whereby said head may be broken off below the face of said locking member after the screw has been driven home.

4. In combination with a cock body having a projecting lug, and a cock key having a similar but shorter lug adapted to be brought into parallelism with the lug on the cock body, of a frangible locking member comprising two parallel lugs connected at one end, said member adapted to straddle the longer lug and bear against the shorter lug, and a screw threaded into the connecting portions of said locking member for fastening the same to the key, said screw having a weakened portion near its head whereby the latter may be broken off below the face of the locking member when the screw has been driven home.

In testimony whereof I have hereunto set my hand in presence of two subscribing witnesses.

PHILIP MUELLER.

Witnesses:
WILLIAM R. BIDDLE,
CATHERINE E. MCKEOWN.